United States Patent [19]

Den Boef

[11] Patent Number: 4,874,246

[45] Date of Patent: Oct. 17, 1989

[54] ARRANGEMENT FOR OPTICALLY MEASURING A DISTANCE BETWEEN A SURFACE AND A REFERENCE PLANE

[75] Inventor: Arie J. Den Boef, Eindhoven, Netherlands

[73] Assignee: U.S. Philips Corp., New York, N.Y.

[21] Appl. No.: 298,200

[22] Filed: Jan. 17, 1989

Related U.S. Application Data

[63] Continuation of Ser. No. 55,656, May 28, 1987, abandoned.

[30] Foreign Application Priority Data

Jun. 4, 1986 [NL] Netherlands .......................... 8601433

[51] Int. Cl.$^4$ ............................................. G01B 11/24
[52] U.S. Cl. .................................................. 356/375
[58] Field of Search ........................... 356/1, 376, 375; 250/201 AF

[56] References Cited

U.S. PATENT DOCUMENTS

| | | | |
|---|---|---|---|
| 3,606,541 | 9/1971 | Sugano et al. ........................ | 396/376 |
| 4,548,504 | 10/1985 | Morander ............................ | 356/376 |
| 4,595,271 | 6/1986 | Suda et al. .................... | 250/201 AF |
| 4,645,347 | 2/1987 | Rioux .................................. | 356/376 |
| 4,677,302 | 6/1987 | Chui et al. ........................... | 250/560 |

FOREIGN PATENT DOCUMENTS 0130831 1/1985 European Pat. Off.
2355185 10/1974 Fed. Rep. of Germany.

*Primary Examiner*—Richard A. Rosenberger
*Attorney, Agent, or Firm*—William L. Botjer

[57] ABSTRACT

An optical distance or profile meter in which radiation reflected from a surface (630) is projected onto a radiation-sensitive detection system via an optical system (641, 642) comprises a radiation-blocking plate (250) formed with radiation windows (651). The radiation-blocking plate only transmit radiation which is reflected from the surface at an angle relative to the optical axis of the optical system. The extent of the pattern of radiation spots thus formed on the detection system is a measure of the distance ($\Delta h$) from the surface. The detection system may comprise a semitransparent filter(660) whose transmission coefficient exhibits a position-dependent variation. This enables the radiation-sensitive element to be constructed as a single element (661) and the effects of speckle noise to be reduced substantially.

13 Claims, 5 Drawing Sheets

ARRANGEMENT FOR OPTICALLY MEASURING A DISTANCE BETWEEN A SURFACE AND A REFERENCE PLANE

This is a continuation of application Ser. No. 055,656, filed May 28, 1987 now abandoned.

BACKGROUND OF THE INVENTION

The invention relates to an arrangement for optically measuring the distance between a surface and a reference plane, comprising a radiation-source unit for illuminating an area on the surface, a radiation-sensitive detection system for converting the radiation reflected from the surface into an electric signal, and an optical system, arranged between the surface and the detection system, for concentrating radiation reflected from the surface on the detection system. The invention also relates to an apparatus for determining the positions of components on a support, which apparatur comprises a system for determining the distance between the surface of the support carrying the components and a reference plane. The optical system may comprise a system of lenses and/or mirrors and converts a diverging beam into a converging or parallel beam.

German patent specification No. 23 55 185 describes an apparatus in which, for measuring the thickness of an object, the distance between the surface of this object and a reference plane is determined. In the known apparatus a narrow laser beam is perpendicularly incident on the surface of the object via a mirror to form a radiation spot on the surface. A part of the radiation originating from the surface is received by an optical system and is concentrated to form a radiation spot in the plane of two adjacent radiation-sensitive photodiodes. The position of the radiation spot on the surface and, consequently, the position of the image formed on the photodiodes is changed by moving the mirror until equal amounts of radiation are incident on both photodiodes. The position of the mirror is now related directly to the thickness of the object.

The apparatus described in said German patent specification No. 23 55 185 comprises a movable mirror whose speed of movement imposes an upper limit on the attainable measurement frequency. Another disadvantage is that close to steep slopes the height of a surface to be measured cannot always be measured correctly owing to shadow effects.

SUMMARY OF THE INVENTION

It is the object of the present invention to provide an optical distance meter which does not require any mechanical readjustment during a measurement and which also enable the local height of the surface at locations where the surface exhibits steep slopes to be measured.

To this end an arrangement in accordance with the invention is characterized in that a radiation-blocking plate is arranged in the radiation path between the surface and the detection system which plate is formed with at least two radiation windows which are situated at some distance from one another and at some distance from the optical axis of the optical system, so as to select a corresponding number of portions from the radiation beam originating from said surface in order to form on the radiation-sensitive detection system radiation spots corresponding to the radiation windows in the radiation-blocking plate, the extent of the pattern of radiation spots thus formed being a measure of the distance between the surface and the reference plane.

The function of the radiation-blocking plate with the radiation windows is to ensure that radiation originating from the surface to be measured can reach the detection system only via the windows. The radiation-blocking plate may comprise, for example, an absorbing plate formed with radiation-transmitting or radiation-reflecting windows or a reflecting plate formed with radiation-transmitting windows. The radiation windows may comprise a plurality of at least two separate windows but may alternatively comprise one elongate, for example, annular window, which may be regarded as an ensemble of a multitude of adjoining windows.

The optical system, for example lens system or a concave mirror, concentrates the beam portions originating from the radiation windows so as to form a pattern of spots in the entrance plane of the detection system, also referred to as the detection plane. The pattern of radiation spots has a specific extent, which is to be understood to mean, for example, the distance between the centres of individual radiation spots or the diameter of an annular spot. The extent of the intensity pattern can be measured by means of a suitably adapted radiation-sensitive detection system. In the case of a suitable choice of the locations of the windows in the radiation-blocking plate it is also possible to derive the distance between the surface and the reference plane from only a part of the pattern of radiation spots. The shadow effect as a result of steep slopes on the surface then effects the measurement result only to a limited extent.

An optical distance meter in accordance with the invention may be characterized in that the optical system comprises two sub-systems and in that the radiation-blocking plate is interposed between the two sub-systems.

Aberrations caused by the entire optical system can be minimized more simple by a suitable choice of the two sub-systems. The reference plane may be situated in the focal plane of the first sub-system, so that the radiation beam originating from the surface to be measured forms a substantially parallel radiation beam between the two sub-systems. Suitably, the distance between the detection plane and the second sub-system is substantially equal to the focal length of said sub-system.

An arrangement in accordance with the invention may be characterized further in that the optical system exhibits spherical aberration.

The spherical aberration of the optical system enables the radial dimensions of the radiation windows in the radiation-blocking plate to be increased without a corresponding increase of the radial dimensions of the radiation spots in the detection plane. This step thus enables the radiation intensity in the detection plane to be increased. However, the detection system must then be arranged at a distance from the optical system which is smaller than the image distance of the optical system. This is because on account of the spherical aberration the pattern of radiation spots in the image plane varies only to a very small extent in the case of a variation of the distance between the surface to be measured and the reference plane. Suitably, only that part of the optical system which is not traversed by the beam originating from the radiation source exhibits spherical aberration.

An optical distance meter in accordance with the invention may be characterized further in that the optical axes of the two sub-systems coincide.

A first embodiment of an optical distance meter in accordance with the invention is characterized further in that an inclined mirror is arranged between the central portion of the radiation-blocking plate and the surface to be measured.

The mirror before the radiation-blocking plate serves to reflect the radiation beam originating from the radiation-source unit towards the surface to be measured. Compared with an embodiment comprising a beam splitter, for example in the form of a semitransparent mirror, this embodiment has the advantage that all the radiation originating from the source is aimed at the surface to be measured and that as much as possible radiation reaches the detection plane. This means that the radiation intensity in the detection plane increases.

A second embodiment of an optical distance meter in accordance with the invention is characterized in that central portion of that side of the radiation-blocking plate which faces the surface to be measured is reflecting and in that the radiation-blocking plate is inclined.

In this embodiment the radiation-blocking plate and the mirror are combined to form a single element.

However, alternatively an optical distance meter in accordance with the invention may be characterized in that the optical axes of the two sub-systems intersect each other at an angle and in that a semitransparent plane mirror is arranged in the point of intersection.

In the present case a semitransparent plane mirror establishes the light path between the two sub-systems. The semitransparent plane mirror may comprise an element which is semitransparent over its entire surface area and which transmits a part of the radiation issuing from the source to the surface to be measured and directs a part of the radiation originating from the surface to the detection system. The radiation-blocking plate is then arranged between the mirror and the second sub-system.

In accordance with a further characteristic feature it is also possible that the semitransparent mirror comprises the radiation-blocking plate which is arranged in the point of intersection of the optical axes of the two sub-systems and whose radiation windows are constructed as mirrors.

In the detection plane the distance from the radiation spot(s) to the optical axis of the optical system must be measured or, which yields the same result, the distance between the individual spots or the diameter of an annular spot must be measured.

An arrangement in accordance with the invention may be characterized in that for each radiation window in the radiation-blocking plate there is provided an array of detectors, which array extends in a radial direction relative to the optical axis of the optical system.

By measuring the detected radiation intensity on the detectors associated with one radiation window, it is possible to determine the position of the centre of gravity of the radiation which is incident on the detector. Such a detection system is described in U.S. Pat. No. 4,233,502, where it is employed for focussing a read unit or write unit for reading or writing information on an optical record carrier.

In a preferred embodiment an arrangement in accordance with the invention is characterized in that the radiation windows in the radiation-blocking plate are situated at equal distances from the optical axis of the optical system and in that the detection system comprises two detectors, one detector surrounding the other, which detectors are spaced from each other by an annular radiation-insensitive intermediate area.

Such a detection system is known per se, for example from European patent application No. 0,130,831, which has been laid open to public inspection, for focussing a read unit for reading information from an optical record carrier.

Position detection is possible by means of a radiation-sensitive detection system comprising a plurality of adjacently arranged discrete radiation-sensitive elements because the radiation spot(s) to be detected illuminate(s) several elements at the same time. The position of the spot(s) is then derived from the relative intensity observed by different adjacent elements. Since in practice the radiation source is virtually always a laser, which emits a coherent beam, substantial intensity differences within a radiation spot, referred to as speckle noise, will arise as a result of interference. These interference effects are caused by pathlength differences between different points of the radiation source and different points of the light spots formed in the detection plane. The path-length differences are determined by microscopic irregularities on the surface to be measured, so that if the surface to be measured is subject to a displacement parallel to the reference plane this gives rise to another pattern of speckle noise and consequently to another distribution of the radiation intensity over the various elements of the detection system. Such a shift of the surface to be measured may therefore result in a small apparent change of the measured distance. It is obvious that this will have an adverse effect on the measurement accuracy.

In order to reduce this adverse effect on the measurement accuracy an arrangement in accordance with the invention may be characterized in that the radiation-sensitive detection system comprises: a beam-splitting element arranged in the radiation path of the radiation beam traversing a window of the radiation-blocking plate, which beam-splitting element splits the radiation beam which is incident on it into a first beam and a second beam, a filter which is arranged in the light path of the first beam and whose transmission coefficient varies monotonically as a function of the distance from the optical axis of the optical system, a first radiation-sensitive element which is arranged behind the filter and which detects the intensity of the radiation traversing the filter, and a second radiation-sensitive element which is arranged in the second beam and which detects the intensity of the radiation in the second beam.

The amount of radiation which is transmitted depends on the position of the radiation spot on the filter. By comparing the intensity of the radiation passing through the filter, as detected by the first radiation-sensitive element, with the intensity of the original beam, of which a constant fraction is detected by the second radiation-sensitive element, it is possible to determine the position of the radiation spot on the filter and hence the distance from the surface to be measured. Since the speckle-noise pattern on the two detectors are correlated and the intensities in the two sub-beams are divided by one another, the influence of speckle noise is substantially eliminated.

The filter may be an absorption filter which absorbs non-transmitted radiation or a reflection filter which splits the beam into two sub-beams, the intensity of each of the two sub-beams being dependent on the location where the incident beam impinges on the reflecting surface. In the latter case the above-mentioned first radiation-sensitive element may be arranged either in the radiation path of the transmitted radiation or in that of the reflected radiation.

An arrangement in accordance with the invention may be characterized further in that the filter is a reflection filter and in that radiation-sensitive elements are arranged in the radiation path of the two radiation beams emerging from the reflection filter, so that the reflection filter simultaneously serves as the beam-splitting element in the radiation-sensitive detection system.

Thus, the beam-splitting element and the semi-transparent filter are combined to form a single component of the detection system, which simplified the construction. Moreover, the total amount of radiation is utilized more efficiently.

A preferred embodiment of the arrangement in accordance with the invention is characterized in that the radiation windows in the radiation-blocking plate are situated at equal distances from the optical axis of the optical system, and in that a semitransparent filter has a transmission coefficient which varies monotonically as a function of the distance from the optical axis of the optical system and said filter is rotationally symmetrical relative to said axis.

Thus, an arrangement for determining the distance between an object plane and a reference plane is obtained which exhibits rotational symmetry and required the use of only one semitransparent filter and two radiation-sensitive elements.

The invention also relates to an apparatus for determining the positions of components on a support, which apparatus comprises an arrangement for determining the distance between the surface of the support carrying the components and a reference plane. This apparatus is characterized in that the arrangement is an arrangement as described in the foregoing.

BRIEF DESCRIPTION OF THE DRAWINGS

Embodiments of the invention will now be described in more detail, by way of example, with reference to the accompanying drawings, in which.

DETAILED DESCRIPTION OF THE PREFERRED EMBODIMENTS

Figure 1A:
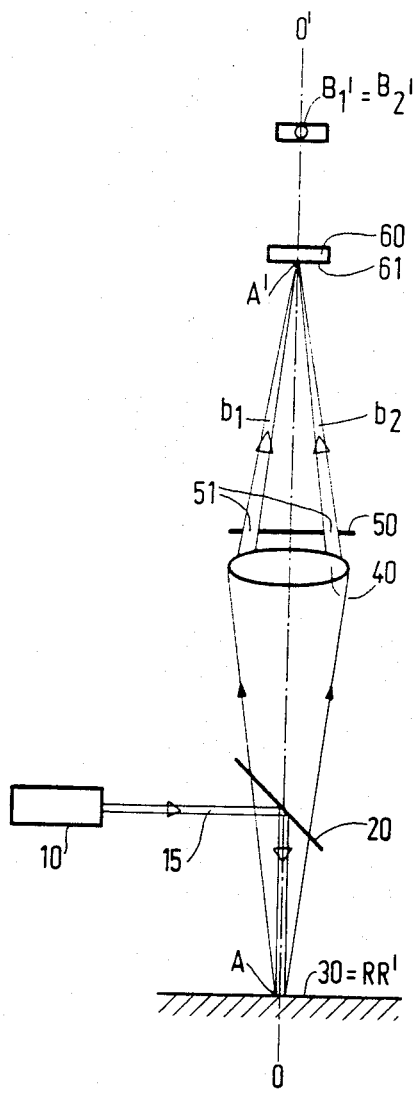
FIGS. 1a and 1b illustrate schematically the inventive principle.

FIG. 1a shows a radiation-source unit 10 which comprises, for example, a semiconductor-diode laser and a collimator lens and which emits a narrow radiation beam 15. A semi-transparent mirror 20 projects the radiation beam substantially perpendicularly onto the surface 30 of an object to form a radiation spot A on this surface. A part of the radiation diffused by the surface 30 is focussed in point A' by the optical system 40, which in the present example is represented as a single lens. When in the radiation path between the object surface 30 and a point A' a radiation-blocking plate 50 is arranged, which plate only transmits the electromagnetic radiation used via a plurality of windows 51, a plurality of narrow beams $b_1, b_2, \ldots, b_n$ corresponding to the number of windows are selected from the radiation which is incident on the radiation-blocking plate 50. These beams intersect each other in point A'.

A radiation-sensitive detection system 60 arranged in the proximity of point A' detects the radiation spots $B_1', B_2', \ldots, B_n'$ formed on the radiation-sensitive surface 61 by the beams. The distance between these radiation spots $B_1', B_2', \ldots, B_n'$ and the optical axis 0—0' of the optical system is a measure of the distance between the surface 30 and the reference plane R—R'. FIG. 1a illustrates a situation in which the surface 30 coincides with the reference plane R—R' and the distance between the radiation-sensitive surface 61 of the detection system and the optical system 40 is selected in such a way that the beams $b_1, b_2, \ldots, b_n$ intersect each other in the detection plane and, consequently, the radiation spots $B_1', B_2', \ldots, B_n'$ coincide.

Figure 1B:
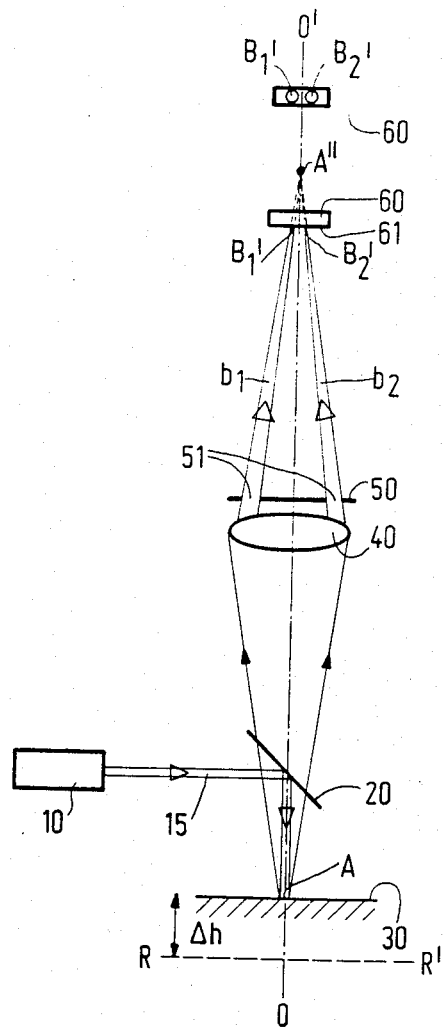

FIG. 1b shows schematically the same arrangement, but now the object surface 30 has been shifted towards the optical system 40 over a distance $\Delta h$. The beams $b_1, b_2, \ldots, b_n$ selected by the radiation-blocking plate are consequently shifted outwards, so that they intersect one another in point A'', which is situated at a slightly larger distance from the optical system than point A'. The radiation spots $B_1', B_2', \ldots, B_n'$ formed on the radiation-sensitive surface 61 of the detection system 60 by the beams are now situated farther from one another and from the optical axis 0—0. By way of illustration the upper parts of FIGS. 1a and 1b show the detection surface as seen from the direction of the optical system in the case of two diametrically disposed windows in the radiation-blocking plate.

The distances between the radiation spots $B_1', B_2', \ldots, B_n'$ are related to the distance of point A'' from the detection plane 61 and to parameters of the arrangement, such as the dimensions of the windows in the radiation-blocking plate, the focal length of the optical system and the relative positions of the various elements. When these parameters are known, it is therefore possible to determine the distance $\Delta h$ between the surface 30 to be measured and the reference plane R—R' from the extent of the radiation pattern in the detection plane 61.

Suitably, the radiation windows 51 of the radiation-blocking plate are arranged as a ring whose centre is situated on the optical axis of the optical system 40. The windows may be contiguous with each other to form a single annular window. In such cases the dimension of the radiation pattern in the detection plane can be determined comparatively simply by measuring the diameter of the annular pattern.

Figure 2:
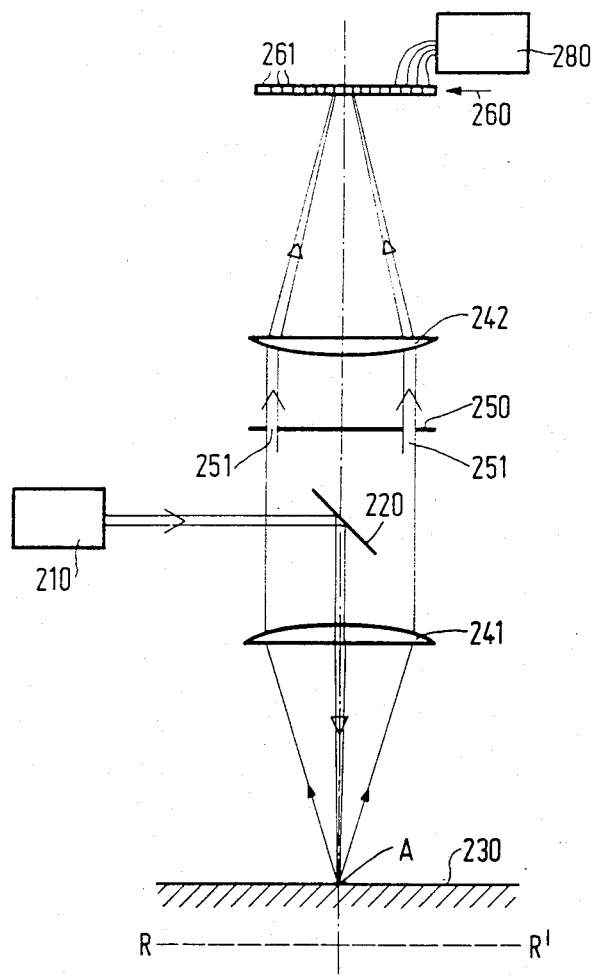
FIG. 2 shows an arrangement in accordance with an embodiment of the invention.

FIG. 2 shows a first embodiment of the arrangement in accordance with the invention. The optical system comprises two separate sub-systems 241 and 242, the distance between the sub-system 241 and the reference plane R—R' being substantially equal to the focal length of this sub-system and the distance between the sub-system 242 and the detection system 260 being substantially equal to the focal length of this sub-system 242. FIG. 2 shows the two optical systems as single planoconvex lenses, but it is also possible to employ differently shaped or compound lenses or concave mirrors.

The space between the two systems 241 and 242 is traversed by the radiation originating from the surface 230 in a substantially parallel beam. The radiation-blocking plate 250 is arranged in this space and blocks the radiation beam except for the portions passing through the radiation windows 251. These windows 251 are arranged in, for example, a ring around the coincident optical axes of the two sub-systems 241 and 242. Between the non-transmitting central portion of the aperture plate and the optical system 241 an inclined mirror 220 is interposed, which mirror reflects the radiation issuing from the radiation source unit 210 towards the surface 230. In comparison with a beam splitter constituted by a normal semitransparent mirror the use of such an inclined mirror has the advantage that the radiation intensity in the detection plane is increased by a factor of at least four.

The radiation-blocking plate 250 need not be a separate plate but may comprise, for example, a radiation-absorbing material deposited on the surface of a lens in the system 242.

A portion-dependent radiation-sensitive detection system 260 comprising, for example, a plurality of radiation-sensitive diodes 261 combined to form a linear or planar array is arranged in the detection plane. By measuring the output signal of each of these diodes in the detection system 260 it is possible to determine the extent of the radiation-spot pattern on the detection system by means of a computer, for example a microprocessor 280, from which the distance $\Delta h$ between the reference plane R—R' and the surface 230 can be derived.

Figure 3A:
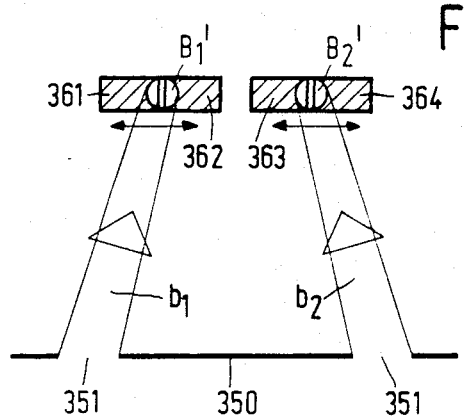
FIGS. 3a and 3b show examples of radiation detection systems suitable for use in an arrangement in accordance with the invention.
Figure 3B:
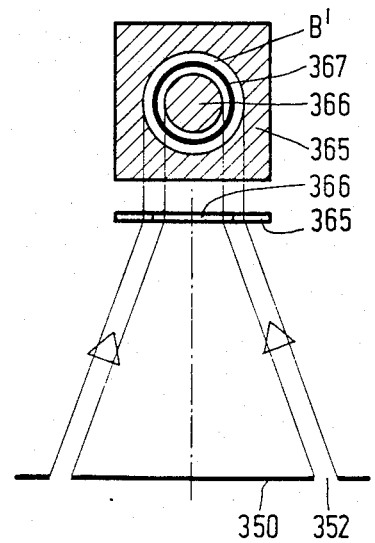

FIGS. 3a and 3b show two examples of such a detection system. In FIG. 3a two beams $b_1$ and $B_2$ which traverse the windows 251 of the radiation-blocking plate 350 are incident on four radiation-sensitive elements 361, 362, 363 and 364. The detectors, for example photodiodes, are paired and are arranged in such a way that a change of the positions of the radiation spots $B_1'$ and $B_2'$ formed by the beams gives rise to a change of the relative intensities observed by each of the two radiation-sensitive elements of the pair. An evaluation of the relative intensities in, for example, an electronic circuit (not shown) enables the positions of and hence the distance between the spots $B_1'$ and $B_2'$ to be measured. A detection system which provides a larger measurement range can be obtained by increasing the number of radiation-sensitive elements in the array.

The detection system shown in FIG. 3b comprises two detectors 365 and 366, the detector 365 surrounding the detector 366 and a radiation-insensitive annular intermediate area 367 being disposed between the two detectors. Through an annular window 352 in the radiation-blocking plate 350 radiation is incident on the detection system where it forms an annular radiation spot B'. The relative intensity observed by the two detectors depends on the radius of this annular radiation spot B'. The radius of the annular radiation spot B' can be determined by an evaluation of the relative intensity in a circuit, not shown. The evaluation yields the same result when the radiation spot B' covers only a part of the ring, for example as a result of the shadow effect caused by steep slopes on the surface to be measured (not shown), or because the window 352 in the radiation-blocking plate 350 does not form complete ring.

Figure 4B:
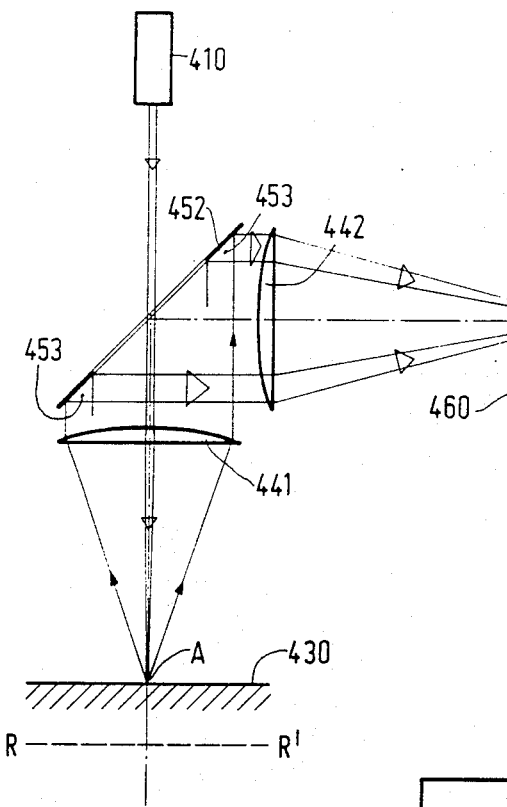
FIGS. 4a and 4b illustrate examples of the construction of the optical system.
Figure 4A:
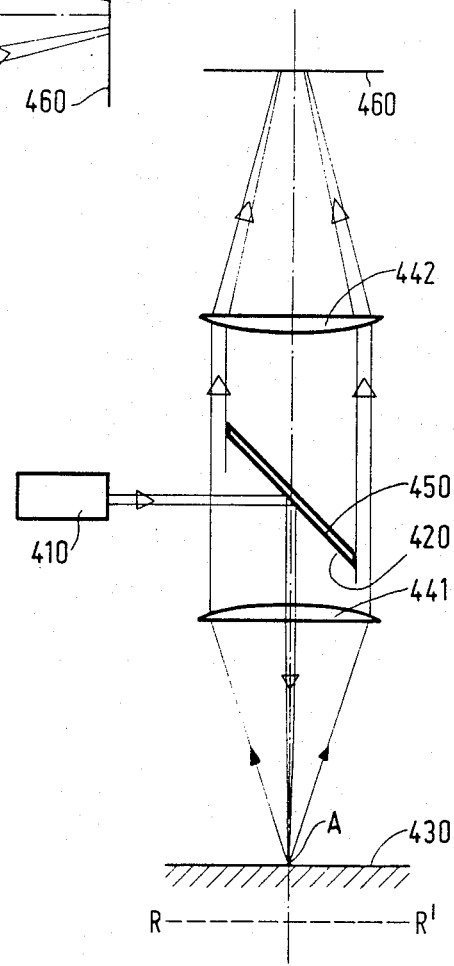

FIG. 4a illustrates another possibility of arranging the radiation-blocking plate and the beam-diverting mirror. The radiation-blocking plate 450 is arranged obliquely between the two sub-systems 441 and 442. The front side 420 of the radiation-blocking plate is reflecting, so that this front side of the radiation-blocking plate reflects the radiation beam issuing from the radiation-source unit 410 towards the first sub-system 441.

FIG. 4b illustrates schematically the complement of the above possibility. The optical axes of the two sub-systems 441 and 442 intersect each other at an angle. The radiation-blocking plate 452 is constructed as a plate whose surface is provided with reflecting sectors 453. The radiation-blocking plate is arranged at the intersection of the optical axes of the two sub-systems, so that a part of the radiation originating from the surface 430 is reflected towards the detection system 460. The reflecting sectors 453 thus function as the windows in the radiation-blocking plate. The radiation beam issuing from the radiation-source unit 410 is directed towards the surface 430 via a transparent portion, for example an aperture, in the plate 452.

Figures 5, 6:
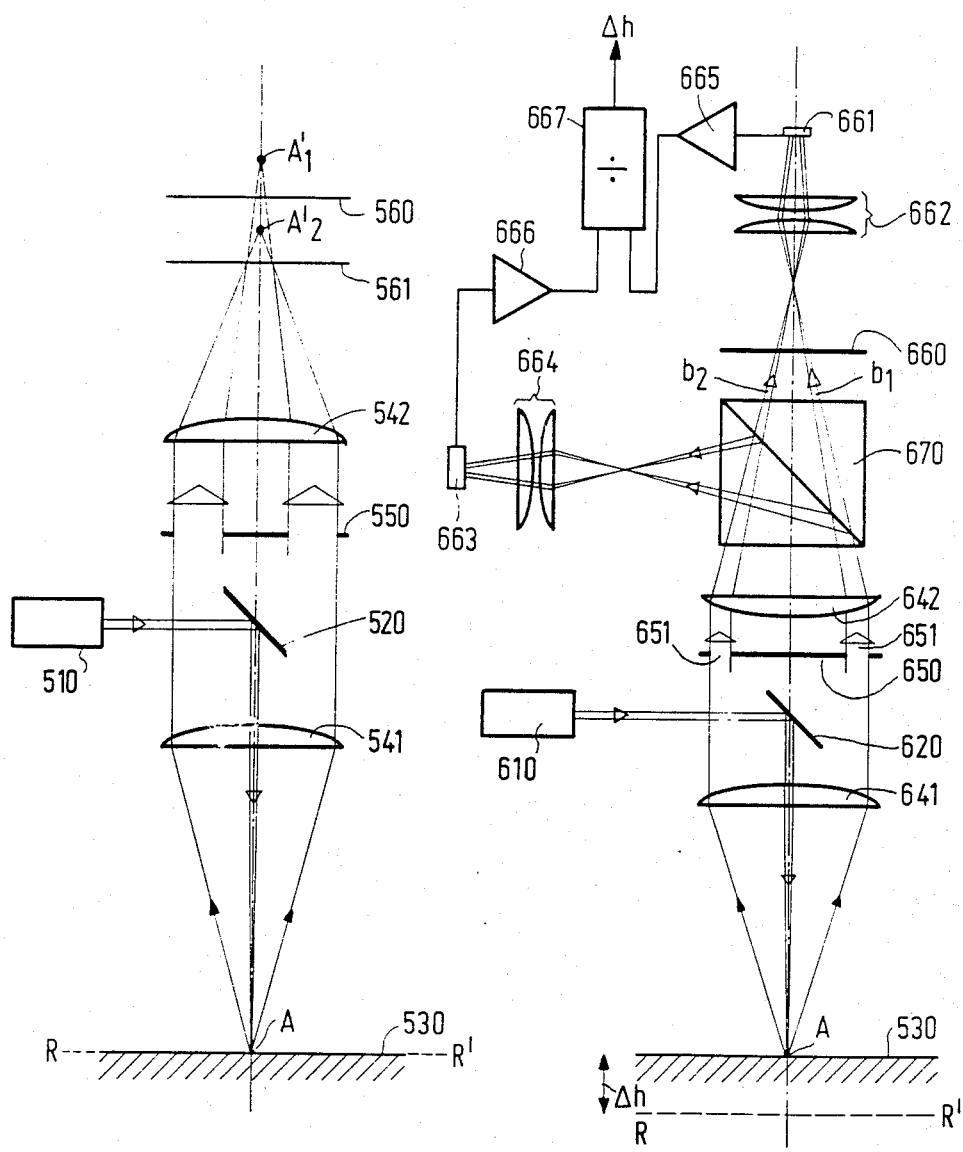
FIG. 5 shows how the radiation intensity in the detection plane can be increased by utilizing the spherical aberration of the optical system.
FIG. 6 shows an embodiment of an arrangement in accordance with the invention, comprising a detection system which enables the influence of speckle noise to be reduced.

FIG. 5 illustrates how the radiation intensity in the detection plane can be increased by utilizing spherical aberration in the optical system. This embodiment is based on the embodiment shown in FIG. 2, to which reference is made for the elements not described hereinafter. The optical system 541 and 542 in FIG. 5 exhibits spherical aberration. In the Figure this is indicated in that the plano-convex lenses representing the sub-systems are shown with the same orientation. The radiation originating from the radiation spot A on the surface 530 is focussed in point $A_1'$ when the radiation passes through the windows in the radiation-blocking plate at a small distance from the optical axis of the optical system, and point $A_2'$ when the radiation passes through the windows in the plate at a larger distance from the optical axis. As a result of the spherical aberration of the optical system point $A_2'$ is situatec closer to the optical system than point $A_1'$. As the radiation path from the edge of the optical system to $A_2'$ intersects the radiation path from the centre of the optical system to point $A_1'$, this means that there is a plane between point $A_2'$ and the optical system 542 where the radiation beam(s) is (are) of small cross-section in a radial direction despite the broad window(s) in the radiation-blocking plate 550. When the radiation-sensitive detection system is arranged in this plane, which bears the reference numeral 561, the broad window in the radiation-blocking plate enables a high radiation intensity on the detection system to be obtained and at the enables the radial dimensions of the spot pattern thus formed to be determined accurately.

Arranging the detection system in the plane 560 is not ideal because in the case of a small distance $\Delta h$ of the surface 530 from the reference plane R—R' this plane is situated between points $A_1'$ and $A_2'$. The size of the radiation spot formed in this plane then depends only slightly on the distance $\Delta h$, thus rendering the measurement very inaccurate.

The radiation-sensitive detection system described with reference to FIGS. 2 and 3 comprise a plurality of radiation-sensitive elements combined to form a linear or planar array. The radiation spot formed on such a detection system has a certain extent so that radiation is incident on several adjacent elements of the detection system. The exact position of the spot must be derived from the relative radiation intensity detected by the various elements. If, as is common practice, the radiation source in the radiation-source unit is a laser, pathlength differences between different points in the radiation source and different points in the radiation spot formed on the detection system give rise to interference effects, which manifest themselves in the radiation spot as "speckle noise", i.e. substantial intensity variations within the spot. Speckle noise affects the relative intensity on the various elements of the detection system and thereby produces an inaccuracy in the measured apparent position of the radiation spot and hence in the measurement of the distance between the object surface and the reference plane which measurement is derived therefrom.

FIG. 6 shows schematically an opticaldistance meter in accordance with the invention in an embodiment in which the radiation-sensitive detection system is constructed in such a way that the inaccuracy caused by speckle noise can be reduced substantially. The actual distance meter corresponds to the distance meter as shown schematically in FIG. 2 and therefore requires no further explanation.

A beam-splitting element 670, for example a splitter prism or a semitransparent mirror, is interposed between the optical system 642 and the detection plane to split the radiation beam originating from the optical system into a non-deviated beam and a deviated beam. The non-deviated beam traverses a semi-transparent filter 660, after which the intensity of this beam is measured by means of a single radiation-sensitive element 661, for example a photodiode. The intensity of the deviated beam is measured by means of a single radiation-sensitive element 663. Optical systems 662 and 664 may be arranged in the radiation paths of the non-deviated and deviated beams for the purpose of adapting the cross-sections of the beams to the dimensions of the radiation-sensitive surface of the radiation-sensitive elements. Suitably, the systems 662 and 664 image the pupil of the optical system on the radiation-sensitive surface of the radiation-sensitive element. The measurement signal is then not affected by any local differences in sensitivity of the radiation-sensitive elements.

The semitransparent filter 660 has a position-dependent and monotonic transmission coefficient which varies to the same extent in the areas over which the beams $b_1, b_2, \ldots, b_n$ travel when the distance $\Delta h$ between the surface 630 to be measured and the reference plane R—R' changes. The fraction of the radiation transmitted by the filter consequently depends on the position where the beams are incident on the filter. A comparison of the intensities of the non-deviated beams as observed by the radiation-sensitive elements 661 with the intensities of the deviated beams as observed by the element 663 yields the positions where the beams are incident on the filter and consequently provides a measure of the distance $\Delta h$ between the surface 630 and the reference plane R—R'.

FIG. 6, by way of example, shows a circuit arrangement for performing this comparison. The output signals of the radiation-sensitive element 661 and 663 are applied to a divider circuit 667 via preamplifiers 665 and 666. The output signal of the divider circuit is a measure of the distance $\Delta h$ to be measured. Another possibility of performing the comparison, not indicated in the Figure, is to vary the intensity of the radiation-source unit 610 until the output signal of the radiation-sensitive element 663 has become equal to a reference signal. The output signal of the radiation-sensitive element 661 is then a direct measure of the transmission by the filter 660 and, consequently, of the distance $\Delta h$.

The radiation-sensitive elements 661 and 663 both detect the entire cross-section of the radiation beams passing through the windows in the radiation-blocking plate 650, so that the pattern of speckle noise within the radiation spot hardly affects the result of the intensity comparison.

When the windows in the radiation-shielding plate are situated at equal distances from the optical axis of the optical system the semitransparent filter may have a rotationally symmetrically varying transmission coefficient and may be centred relative to the optical axis. The transmission coefficient then varies monotonically as a function of the distance from the optical axis of the optical system.

Figure 7:
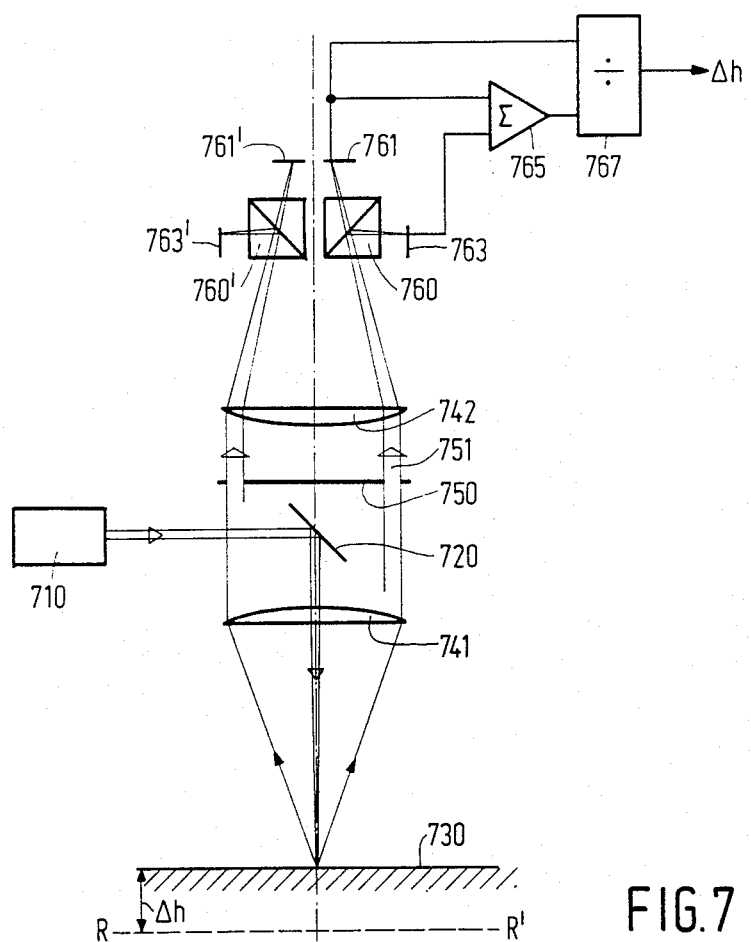
FIG. 7 shows another embodiment in which speckle-noise reduction is applied.

The semitransparent filter may be an absorption filter in which the non-transmitted radiation is absorbed or a reflection filter in which the non-transmitted radiation is reflected as a diverted beam. FIG. 7 shows schematically an embodiment of an optical distance meter in accordance with the invention in which a semitransparent reflection filter is used and in which this filter also serves as the beam-splitting element in the radiation-sensitive detection system.

The radiation traversing the window 751 of the radiation-blocking plate 750 is incident on the reflection filter 760, for example a splitting prism which exhibits frustrated total reflection. The intensity of the non-deviated beam is detected by the radiation-sensitive element 761 and that of the deviated beam by the radiation-sensitive element 763. The intensity of the original beam is determined by means of the adder circuit 765 and the relative transmission in the divider circuit 767, whose output signal is a measure of the height $\Delta h$ to be measured. Radiation passing through the other windows in the radiation-blocking plate is detected in a similar way by means of the equivalent elements 760', 761' and 763'. These elements may be integral with the elements 760, 761 and 763.

In detection systems of these types the effect of speckle noise is reduced considerably. Speckle noise still has a slight influence because the transmission coefficient varies slightly within the radiation spot. This influence can be reduced by constructing the semitransparent filter as two filters arranged one behind the other, the first filter being situated before and the second filter being situated behind the point of narrowest constriction in the beam. The transmission coefficients of the two filters vary as opposite linear functions of the distance from the optical axis of the optical system. A radiation beam which passes through a window in the radiation-blocking plate intersects the optical axis in the region between the two filters. When this beam is displaced because the distance of the surface to be measured from the reference plane changes, the attenuation to which the beam is subjected will increase or decrease in the two filters because the transmission coefficients of the two filters vary oppositely. Conversely, the relative intensity distribution within the beam in a radial direction will change hardly. Since the point of narrowest constriction is situated between the two filters the radial intensity distribution within the beam is inverted between the two filters. As a result of this, a part of the beam which is attenuated comparatively strongly in the first filter will be attenuated comparatively weakly in the second filter and vice versa. The attenuation within the beam after passage through the two filters therefore exhibits a minimal variation in a radial direction.

Figure 8:
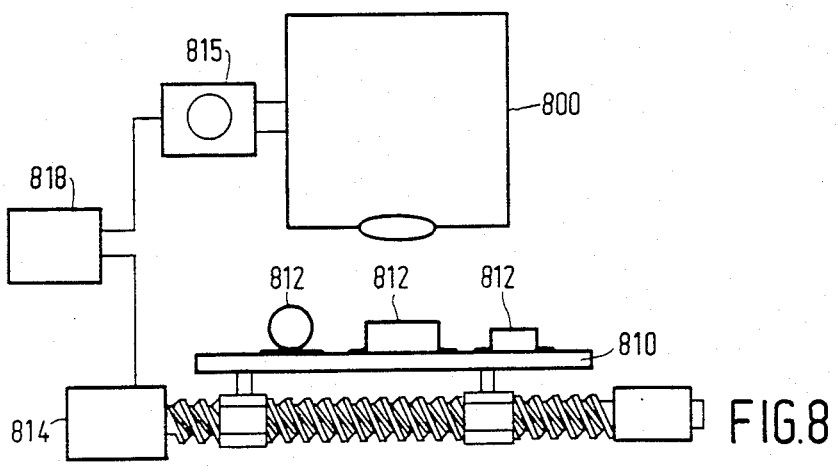
FIG. 8 shows schematically an apparatus in accordance with the invention for determining the positions of components on a support.

The optical distance meters described in the foregoing may be utilized in an apparatus for determining the positions of components on a support. FIG. 8 shows an example of such an apparatus in accordance with the invention. In this Figure the reference numeral 800 schematically represents an optical distance meter in one of the embodiments described above. The support 810 carries components 812 which differ from the carrier inter alia by a difference in height. The carrier 810 is moved underneath the distance meter in a first direction, for example by means of a drive system 814, and the distance meter 800 is moved in a second direction perpendicular to the first direction, for example by a drive system 815, the two directions being parallel to the plane of the support. The two drive systems are controlled by a control system 818 in such a way that the entire surface area is scanned in an efficient manner, for example by a zig-zag movement. The movement of the support may be continuous or in steps. The movement is so slow that at any position it is possible to determine unambiguously whether a component is present or absent.

An alternative method of scanning the surface to be measured is by using a telecentric scanning method. The scanning movement in one or both directions is obtained by sweeping the surface to be measured with the beam, for example be means of a rotating mirror. It may then be necessary to arrange an optical system, for example a lens, between the rotating mirror and the surface to be measured in order to maintain the angle at which the surface is observed constant, so that inaccuracies are precluded.

What is claimed is:

1. An apparatus for optically measuring the distance between a surface and a reference plane, comprising a radiation-source unit for illuminating an area on the surface with a narrow substantially parallel beam of radiation, a radiation-sensitive detection system for converting the radiation reflected from the surface into an electric signal, and an optical system having spherical aberration arranged between the surface and the detection system for concentrating radiation reflected from the surface on the detection system and said detection system being located at a position such that the radiation reflected from the surface is of a small cross section due to said spherical aberration, means for directing said radiation from said radiation-source unit along the optical axis of the optical system wherein a radiation-blocking plate is arranged in the radiation path between the surface and the detection system, which plate is formed with at least two radiation windows which are situated at a predetermined distance from one another and at a predetermined distance from the optical axis of the optical system, so as to select corresponding portions from the radiation beam originating from said surface in order to form on the radiation-sensitive detection system radiation spots corresponding to the radiation windows in the radiation-blocking plate, the extent of the pattern of radiation spots thus formed being a measure of the distance between the surface and the reference plane.

2. An arrangement as claimed in claim 1, characterized in that the optical system comprises two sub-systems and in that the radiation-blocking plate is interposed between the two sub-systems.

3. An arrangement as claimed in claim 2, characterized in that the optical axes of the two sub-systems coincide.

4. An arrangement as claimed in claim 2, characterized in that the optical axes of the two sub-systems intersect each other at an angle and in that a semitransparent plane mirror is arranged in the point of intersection.

5. An arrangement as claimed n claim 4, characterized in that the semitransparent mirror comprises the radiation-blocking plate which is arranged in the point of intersection of the optical axes of the two sub-systems and whose radiation windows are constructed as mirrors.

6. An arrangement as claimed in claim 1 characterized in that said means for directing said radiation from said radiation source unit include an inclined mirror arranged between the central portion of the radiation-blocking plate and surface to be measured.

7. An arrangement as claimed in claim 1, characterized in that the central portion of that side of the radiation-blocking plate which faces the surface to be measured is reflecting and in that the radiation-blocking plate is in an inclined position.

8. An arrangement as claimed in claim 1 characterized in that for each radiation window in the radiation-blocking plate there is provided an array of detectors which array extends in a radial direction relative to the optical axis of the optical system.

9. An arrangement as claimed in claim 1 characterized in that the radiation windows in the radiation-blocking plate are situated at equal distances from the optical axis of the optical system and in that the detection system comprises two detectors, one detector surrounding the other, which detectors are spaced from each other by an annular radiation-sensitive intermediate area.

10. An arrangement as claimed in claim 1 characterized in that the radiation-sensitive detection system comprises: a beam-splitting element arranged in the radiation path of the radiation beam traversing a window of the radiation-blocking plate, which beam-splitting element splits the radiation beam which is incident on it into a first beam and a second beam, a filter which is arranged in the light path of the first beam and whose transmission coefficient varies monotonically as a function of the distance from the optical axis of the optical system, a first radiation-sensitive element which is arranged behind the filter and which detects the intensity of the radiation traversing the filter, and a second radiation-sensitive element which is arranged in the second beam and which detects the intensity of the radiation in the second beam.

11. An apparatus for optically measuring the distance between a surface and a reference plane, comprising a radiation-source unit for illuminating an area on the surface with a narrow substantially parallel beam of radiation, a radiation-sensitive detection system for converting the radiation reflected from the surface into an electric signal, and an optical system, arranged between the surface and the detection system for concentrating radiation reflected from the surface on the detection system, means for directing said radiation from said radiation-source unit along the optical axis of the optical system wherein a radiation-blocking plate is arranged in the radiation path between the surface and the detection system, which plate is formed with at least two radiation windows which are situated at a predetermined distance from one another and at a predetermined distance from the optical axis of the optical system, so as to select corresponding portions from the radiation beam originating from said surface in order to form on the radiation-sensitive detection system radiation spots corresponding to the radiation windows in the radiation-blocking plate, the extent of the pattern of radiation spots thus formed being a measure of the distance between the surface and the reference plane, the radiation sensitive detection system including a beam splitting element arranged in the radiation path of the radiation beam traversing a window of the radiation-blocking plate, said beam splitting element splitting the radiation beam which is incident thereupon into first and a second beam, a filter being disposed in the light path of the first beam and having a transmission coefficient varying monotonically as a function of the distance from the optical axis of the optical system, a first radiation sensitive element is disposed behind the filter and detects the intensity of the radiation traversing the filter and a second radiation sensitive element disposed in the second beam and which detects the intensity of the radiation of the second beam.

12. An arrangement as claimed in claim 11, characterized in that the filter is a reflection filter and in that radiation-sensitive elements are arranged in the radiation path of the two radiation beams emerging from the reflection filter, so that the reflection filter simultaneously serves as the beam-splitting element in the radiation-sensitive detection system.

13. An arrangement as claimed in claim 11 characterized in that the radiation windows in the radiation-blocking plate are situated at equal distances from the optical axis of the optical system, and in that a semi-transparent filter has a transmission coefficient which varies monotonically as a function of the distance from the optical axis of the optical system and said filter is rotationally symmetrical relative to said axis.

* * * * *